United States Patent
Sigshøj et al.

(10) Patent No.: US 12,435,697 B2
(45) Date of Patent: Oct. 7, 2025

(54) WIND TURBINE (71) Applicant: KiteX ApS, Søborg (DK)

(72) Inventors: Christoffer Sigshøj, Søborg (DK); Andreas Bruun Okholm, Søborg (DK)

(73) Assignee: KITEX APS, Søborg (DK)

( * ) Notice: Subject to any disclaimer, the term of this patent is extended or adjusted under 35 U.S.C. 154(b) by 20 days.

(21) Appl. No.: 18/573,792

(22) PCT Filed: Jun. 23, 2022

(86) PCT No.: PCT/EP2022/067267
§ 371 (c)(1),
(2) Date: Dec. 22, 2023

(87) PCT Pub. No.: WO2022/268999
PCT Pub. Date: Dec. 29, 2022

(65) Prior Publication Data
US 2024/0229765 A1  Jul. 11, 2024

(30) Foreign Application Priority Data
Jun. 24, 2021 (DK) .............................. PA202170329

(51) Int. Cl.
*F03D 7/02* (2006.01)
*F03D 1/06* (2006.01)

(52) U.S. Cl.
CPC .......... *F03D 7/0224* (2013.01); *F03D 1/065* (2013.01); *F05B 2260/74* (2013.01)

(58) Field of Classification Search
CPC .... F03D 7/0224; F03D 1/065; F05B 2260/74; F05B 2270/602; F05B 2260/79; Y02E 10/72
See application file for complete search history.

(56) References Cited

U.S. PATENT DOCUMENTS

| | | | | |
|---|---|---|---|---|
| 1,033,351 A | * | 7/1912 | Romans | ................. F03D 7/022 |
| | | | | 416/51 |
| 3,879,153 A | * | 4/1975 | Breuner | ................. B64C 27/33 |
| | | | | 416/138 |

(Continued)

FOREIGN PATENT DOCUMENTS

| | | |
|---|---|---|
| CN | 205955910 U | 2/2017 |
| FR | 2 614 941 A1 | 11/1988 |

(Continued)

OTHER PUBLICATIONS

International Search Report (PCT/ISA/210) issued in PCT/EP2022/067267, dated Sep. 2, 2022.

(Continued)

*Primary Examiner* — Pedro J Cuevas
(74) *Attorney, Agent, or Firm* — Birch, Stewart, Kolasch & Birch, LLP (57) ABSTRACT

The wind turbine (1) includes a tower (2) supporting a main boom (3) carrying a rotor (4) of the axial flow type having a main rotation axis and including a hub (5) carrying a number of blades (6) being supported by blade lines (7, 8). A pitch angle of each blade about its pitch axis is controllable by coordinated movement of a set of at least a first displace-able pitch control cable (10) and a second displace-able pitch control cable (11) acting on said blade. Each pitch control cable has a blade end (12) being attached to the respective blade at a longitudinal position more than ⅓ of the total blade length away from the main rotation axis and has a boom end (13) being attached to a pitch control mem-ber (14) arranged rotatably on the main boom and being adapted to displace the pitch control cable.

20 Claims, 9 Drawing Sheets

(56) References Cited

U.S. PATENT DOCUMENTS

| | | | | |
|---|---|---|---|---|
| 4,319,865 A | * | 3/1982 | Richard | F03D 1/0608 |
| | | | | 416/41 |
| 4,335,996 A | | 6/1982 | Ross | |
| 4,352,629 A | * | 10/1982 | Cheney, Jr. | F03D 7/0224 |
| | | | | 416/139 |
| 9,759,182 B2 | * | 9/2017 | Versavel | F03D 13/30 |
| 10,087,914 B2 | * | 10/2018 | Leijnen | F03D 1/0675 |
| 11,073,135 B2 | * | 7/2021 | Rothers | F03D 9/25 |
| 12,066,003 B2 | * | 8/2024 | Nielsen | F03D 1/0658 |
| 2011/0309625 A1 | * | 12/2011 | Dehlsen | F03D 1/0658 |
| | | | | 290/55 |
| 2012/0051912 A1 | | 3/2012 | Shi | |
| 2012/0051914 A1 | * | 3/2012 | Dehlsen | F03D 7/0228 |
| | | | | 416/147 |
| 2013/0045080 A1 | * | 2/2013 | Kirke | F03D 3/068 |
| | | | | 416/119 |

FOREIGN PATENT DOCUMENTS

| | | | | |
|---|---|---|---|---|
| GB | 182740 | 7/1922 | | |
| WO | WO-2011130797 A1 | * | 10/2011 | F03D 3/068 |
| WO | WO 2014/187933 A2 | | 11/2014 | |
| WO | WO 2015/171347 A1 | | 11/2015 | |

OTHER PUBLICATIONS

Written Opinion of the International Searching Authority (PCT/ISA/237) issued in PCT/EP2022/067267, dated Sep. 2, 2022.

* cited by examiner

WIND TURBINE

The present invention relates to a wind turbine including a tower supporting a main boom carrying a rotor of the axial flow type and at least one generator, the rotor having a main rotation axis, the rotor including a hub carrying a number of blades being supported by blade lines, each blade being attached rotatably to the hub about a pitch axis, and each blade having a total blade length from the hub to a tip of the blade.

By supporting the blades by means of lines rather than providing self-supporting blades, the rotor has been structurally optimised to reduce weight. If the tower is also supported by means of lines, rather than providing a self-supporting tower, the entire wind turbine may be structurally optimized for reduced weight. This means that the structure can be made up to approximately 90% lighter than a comparable horizontal axis wind turbine and thereby cheaper to manufacture and install.

WO 2015/171347 A1 discloses a structurally optimized tilted or horizontal axis wind turbine which is a further development of the horizontal axis wind turbine. The structurally optimised wind turbine comprises a tower, guy wires, a horizontal or tilted rotation axis and blades supported by tethers. The turbine is structurally optimized by transferring the loads on the blades through tethers to the top of the tower and from the top of the tower to the ground through the guy wires. One end of each tether is attached to a blade, while another end of the tether is attached to a power take off ring, co-axial with said rotation axis. In this way, the tethers are arranged to transfer the torque resulting from the load on the blades to the power take off ring. The blades are preferably pitch controlled and an electronic control system is provided to control at least the pitch of the blades.

U.S. Pat. No. 1,533,467 discloses a governor for windmills incorporating a pitch system for the blades of a windmill.

Generally it is known from regular horizontal axis wind turbines and from the structurally optimised type mentioned above that having a pitch-system for the blades is an advantageous method to reduce the power and loads experienced by the turbine. Thereby, the overall cost effectiveness of the turbine may be increased.

Furthermore it is generally known that having an individual blade pitch or a cyclic pitch action on the rotor can be advantageous in order to further reduce the loads on the turbine or provide a desirable yaw moment to the turbine.

EP 2 132 437 B2 describes a wind turbine with a computer controlled pitch control system which adjusts the cyclic pitch in order to achieve a load reduction on the main bearing.

While the benefits of cyclic pitch and pitch action is well known for both small and large horizontal axis wind turbines it is typically not implemented in small to medium sized wind turbines due to the control and mechanical complexity involved in such systems.

U.S. Pat. No. 7,175,389 B2 describes methods and apparatus for reducing peak wind turbine loads by individually actuating the pitch of each blade by an individual electro-mechanical servo or hydraulic activated servo located in the rotor hub. This solution is most commonly used today; however, the method does not work satisfactorily for a structurally optimised wind turbine of the type mentioned above transferring the loads on the blades through tethers to the top of the tower.

In a wind turbine of said structurally optimised type, the inner part of the rotor is made to be as lightweight as possible and therefore is not torsionally stiff. Typically, each blade is mounted on a hub by means of a spar which is not torsionally stiff. This results in large deviations in pitch angle between the angle set at the hub and the resulting angle at the tip of the blade due to the inertia of the blade, the moment exerted by the aerodynamic forces or moments generated by the tether attachments. Furthermore the system might be mechanically unstable and show flutter behaviour at apparent wind speeds as low as 15 m/s.

CN 106089573 A discloses a structurally optimised wind turbine rotor of the type mentioned above. However, according to this document, the torque resulting from a load on the blades of the rotor is transferred directly from the root of the blades to the hub of the rotor. According to the document, pitch actuation drives are placed at the middle of the respective blades. This solution addresses the problem of deviating pitch angles in a wind turbine in which the inner part of the rotor is not torsionally stiff. However, this solution requires a separate pitch servo for each blade. Furthermore, the mass of a pitch servo is placed on each blade. Further electric cabling and the use of a slip ring is required for the electric connection of each pitch servo. Furthermore, in order to achieve cyclic pitch with the proposed solution, the servo and gears need to be activated through every revolution the rotor makes, which causes excessive wear on the components.

Achieving a cycling pitch change without moving the servos could be done using a swashplate commonly found in rotary aircrafts. However, those systems are mechanically complex and wear quickly and are hence not used commonly in wind turbines.

U.S. Pat. No. 8,668,455 B2 discloses a wind turbine with a turbine wheel in which the tip of each blade is supported by blade lines. However, according to this document, the torque resulting from a load on the blades of the rotor is transferred directly from the root of the blades to the hub of the rotor and not through the blade lines. The turbine blades can be of a rigid or pliant material. An angle of incidence of the rigid blades can be adjusted by rotating the mast. An angle of incidence of the pliant blades can be adjusted by applying tension to a blade control cable. Pliant blades can be retracted into the mast via a retracting mechanism to reduce the exposed surface area when subjected to excessive wind speeds. However, according to this solution, the blade control cable is at a significant amount of tension and it would require a strong servo to operate. Furthermore, given the design, it is unlikely that it would be possible to achieve a significant cyclic pitch action.

The object of the present invention is to provide a simple and effective pitch control in a wind turbine having a rotor being structurally optimised by supporting the blades by means of blade lines.

In view of this object, a pitch angle of each blade about its pitch axis is controllable by coordinated movement of a set of at least a first displaceable pitch control cable and a second displaceable pitch control cable acting on said blade, and each pitch control cable has a blade end being attached to the respective blade at a longitudinal position more than ⅓ of the total blade length away from the main rotation axis and has a boom end being attached to a pitch control member arranged rotatably on the main boom and being adapted to displace the pitch control cable.

In this way, by providing pitch control by means of coordinated movement of a set of pitch control cables attached to the blade at a substantial distance from the hub of the rotor, in a rotor supported by blade lines, a simple and optimised mechanical solution for pitch control may be obtained in a rotor which may be structurally optimised to have a substantially reduced weight. By providing a pitch control member for the pitch control cable, arranged rotatably on the main boom, the blades do not need to carry the pitch control members, and no complicated electric connections for pitch servos arranged on the blades are needed.

Furthermore, by providing the pitch control member rotatably on the main boom, if desired, a single pitch control member may be used for the first displaceable pitch control cables of all blades of the rotor, and a single pitch control member may be used for the second displaceable pitch control cables of all blades of the rotor. Alternatively, for each blade, a single pitch control member may be used for the first displaceable pitch control cable and for the second displaceable pitch control cable. For instance, a pitch servo drive may rotate a drum or the like around which the first and second displaceable pitch control cables are wound. In this case, the first and second displaceable pitch control cables may have the form of one continuous displaceable pitch control cable. A pitch servo drive for each blade may be arranged on a rotatable member arranged rotatably about the main boom.

The coordinated movement of the set of at least a first and a second displaceable pitch control cable acting on said blade may be accomplished mechanically or electronically.

In an embodiment, at least a first and a second pitch control ring are arranged rotatably on the main boom, the first pitch control ring forms a common pitch control member for the first displaceable pitch control cables of the respective blades of the rotor, and the second pitch control ring forms a common pitch control member for the second displaceable pitch control cables of the respective blades of the rotor. Thereby, a particularly simple mechanical solution may be obtained in that only two pitch control members may control the pitch of all blades of the rotor.

In an embodiment, the first and second pitch control rings are arranged displaceably on the main boom, and the movement of the first and second pitch control rings in relation to each other is coordinated for opposed sliding motion in relation to each other. Thereby, a particularly simple solution may be obtained. In particular, a simple mechanical solution may be obtained in that the movement of the first and second pitch control rings in relation to each other may be mechanically coordinated for opposed sliding motion in relation to each other.

In a structurally particularly advantageous embodiment, first and second sliders carrying the first and second pitch control rings, respectively, by means of respective first and second bearings, are arranged displaceably along the main boom, a synchronising belt has a first part fixed to the first slider and a second part fixed to the second slider, an intermediate part of the synchronising belt arranged between the first part and the second part of the belt runs over a belt pulley and thereby changes the direction of movement of the first part of the belt in relation to the second part of the belt, and the belt pulley is driven by means of a common pitch servo drive. Thereby, the movement of the first and second pitch control rings in relation to each other may be mechanically coordinated for opposed sliding motion in relation to each other by means of one single common pitch servo drive.

In an embodiment, the first and second pitch control rings have respective first and second rotation axes which are inclined in opposite directions in relation to the main rotation axis of the rotor. Thereby, cyclic pitch movement as described above may be achieved in a wind turbine having a structurally optimised rotor of the above-described type.

The respective first and second rotation axes may typically be inclined in a vertical plane including a longitudinal axis of the tower. By pretensioning the first and second displaceable pitch control cables to activate the blade pitch, the movement and forces can be balanced such that much faster response times and stronger cyclic pitch action may be achieved with less mechanical strength required for actuation. Cyclic pitch and common pitch change may be obtained with less mechanical complexity.

In an embodiment, the first and second pitch control rings have respective first and second rotation axes, an angle between the first rotation axis and the main rotation axis of the rotor and an angle between the second rotation axis and the main rotation axis of the rotor, respectively, are adjustable by means of respective inclination servos or by means of a single common inclination servo. Thereby, the cyclic pitch movement as described above may be further optimised in that said angle may be adjusted by means of said servo or servos.

In an embodiment, each blade includes a spar and an airfoil, the spar connects the airfoil to the hub, the spar has a length of at least ⅓, and preferably at least ½, of the total blade length from the hub to the tip of the blade, and the blade end of each pitch control cable is attached to the respective blade at the connection between the spar and the airfoil or longer away from the main rotation axis. Thereby, the rotor of the wind turbine may be particularly structurally optimised in that the central part of the rotor may be extremely lightweight. Because the blade end of each pitch control cable is attached to the respective blade at the connection between the spar and the airfoil or longer away from the main rotation axis, the pitch of each blade may be effectively controlled although the spars are not torsionally stiff. Furthermore, it may be ensured that the system may be mechanically stable and does generally not show flutter behaviour.

In a structurally particularly advantageous embodiment, each blade is provided with a blade torsion beam extending in a traverse direction of the pitch axis of said blade, preferably in a direction from a leading edge to a trailing edge of said blade, and more preferred in a general direction of a chord of said blade, the blade end of the first displaceable pitch control cable is connected at a first end of the blade torsion beam, and the blade end of the second displaceable pitch control cable is connected at a second end of the blade torsion beam. Thereby, a suitable balanced pitching moment may be achieved about the pitch axis of the blade, although the pitch axis may be located nearer the leading edge of the blade than the trailing edge of the blade.

In an embodiment, the blade lines are arranged to transfer a torque resulting from a load on the blades of the rotor to a rotatable member in geared connection with the generator. Thereby, the blades themselves do not need to transfer the torque resulting from a load on the blades to the hub of the rotor. Thereby, the rotor of the wind turbine may be particularly structurally optimised in that the central part of the rotor may be extremely lightweight. This may be achieved due to the fact that in addition to the spars not needing to be torsionally stiff, the spars do also not need bending stiffness in order to transfer said torque. The combination of the support of the blades by means of the blade lines and by means of the pitch control cables may therefore provide for a particularly structurally optimised rotor.

The invention will now be explained in more detail below by means of examples of embodiments with reference to the very schematic drawing, in which.

Figure 1:
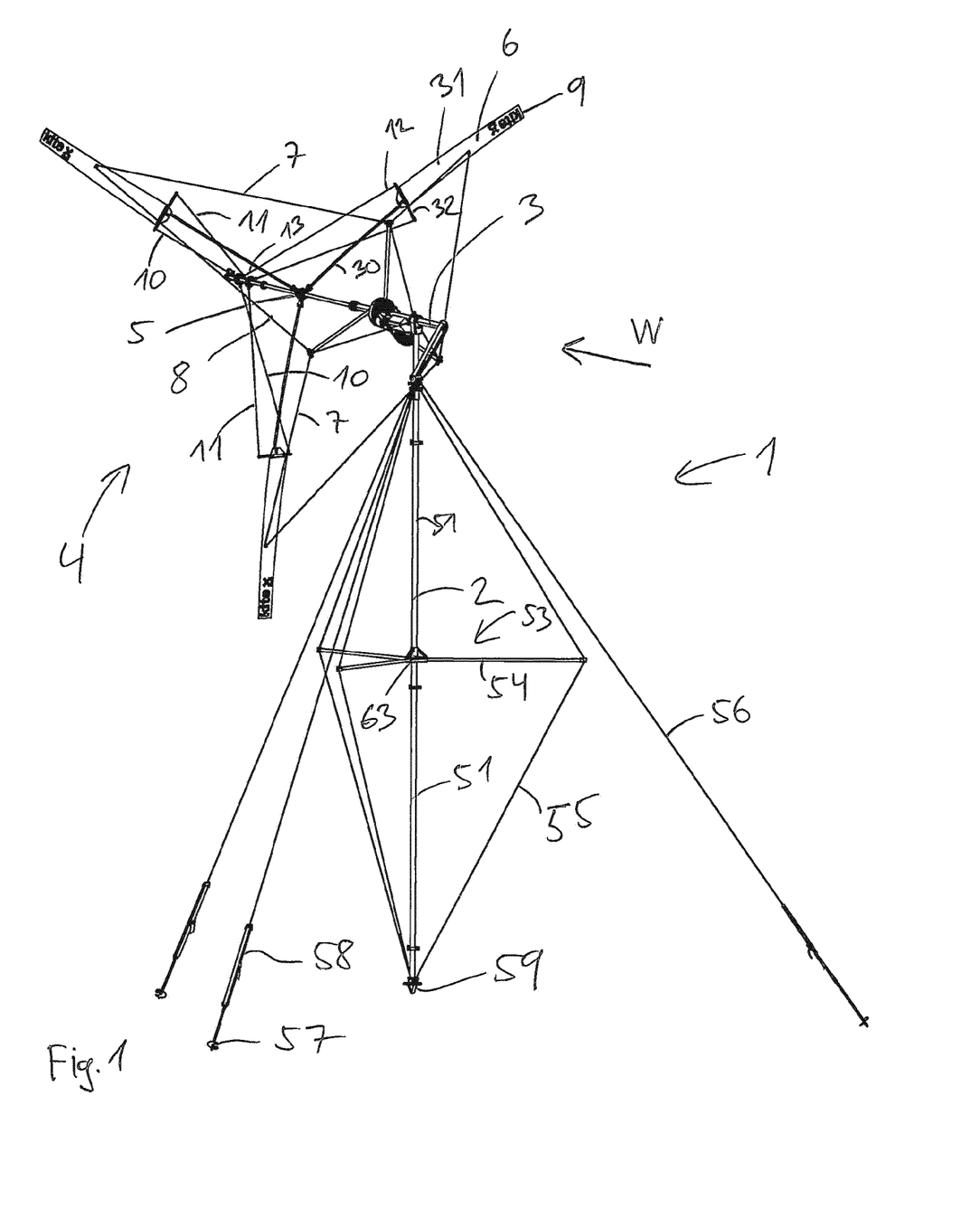
FIG. 1 is a perspective view of a wind turbine according to the present invention, seen obliquely from the wind direction.

FIG. 1 shows a wind turbine 1 according to the present invention, including a tower 2 supporting a main boom 3 carrying a rotor 4 of the axial flow type, and a generator 62 driven by the rotor. The wind turbine 1 is a horizontal or inclined axis wind turbine in which the rotor 4 is placed downwind in relation to the tower 2.

Figure 5:
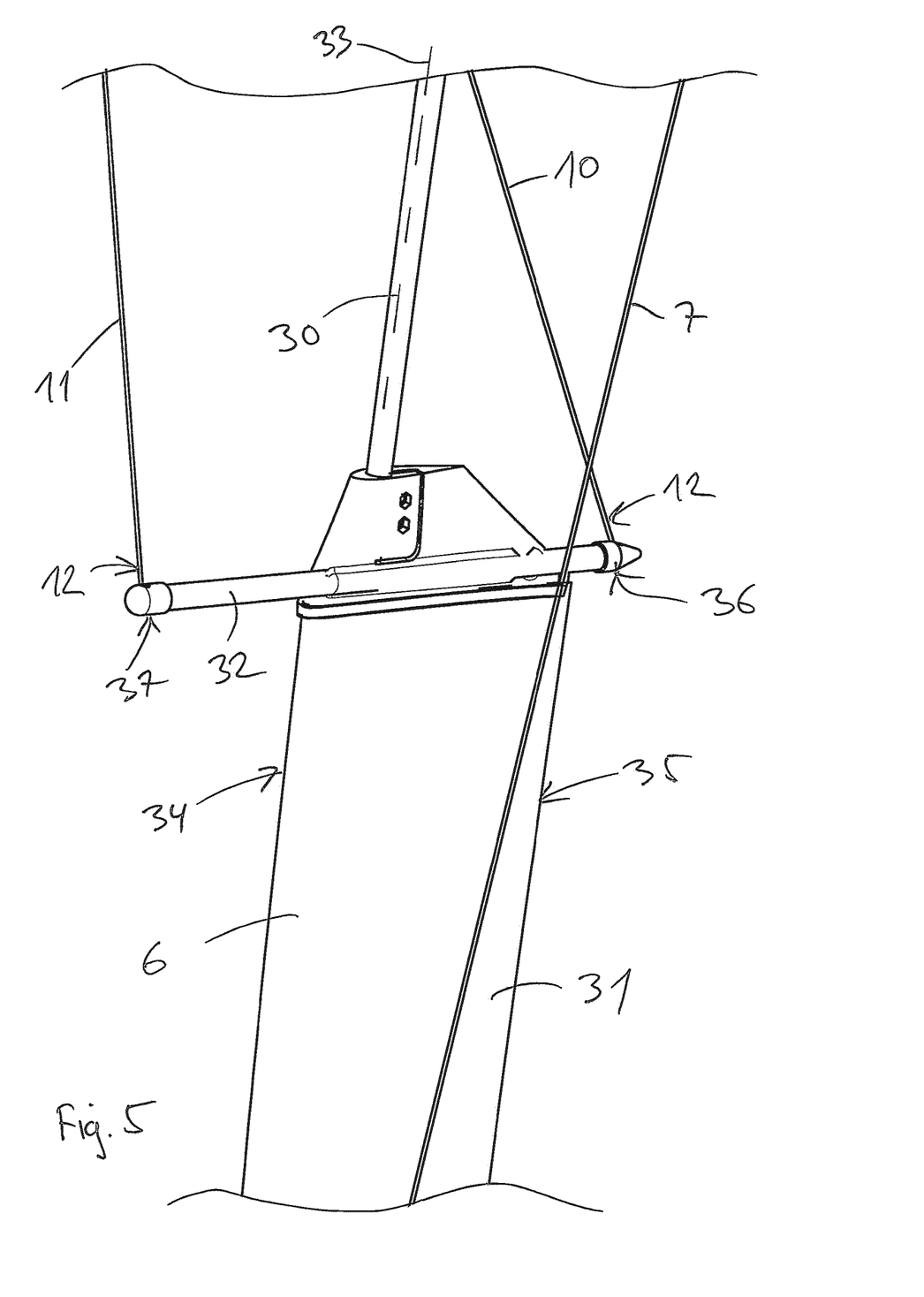
FIG. 5 illustrates a detail of a rotor blade of the wind turbine of FIG. 1, seen on a larger scale.
Figure 6:
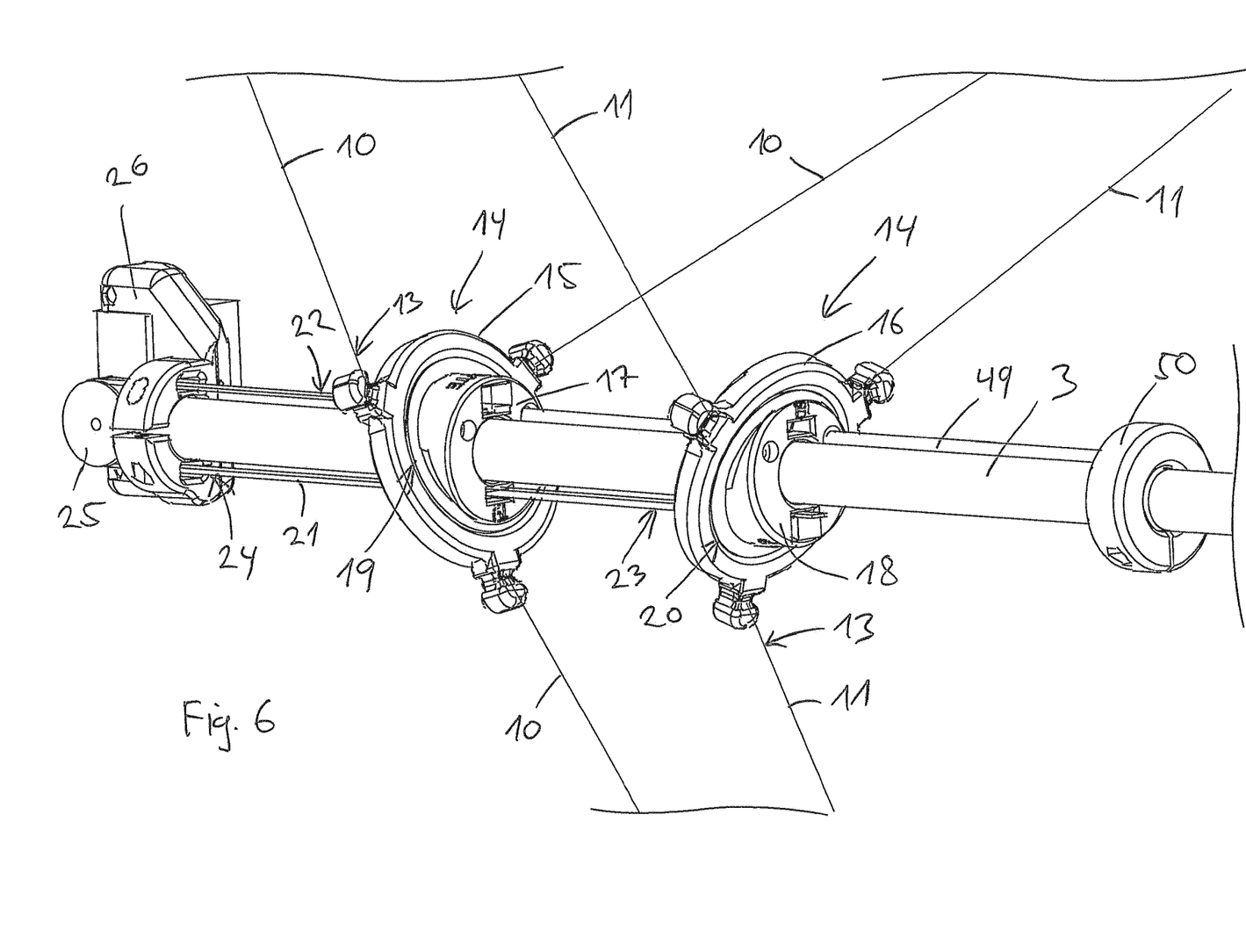
FIG. 6 is a perspective view of part of a pitch control system of the wind turbine of FIG. 1, seen obliquely from a side.
Figure 7:
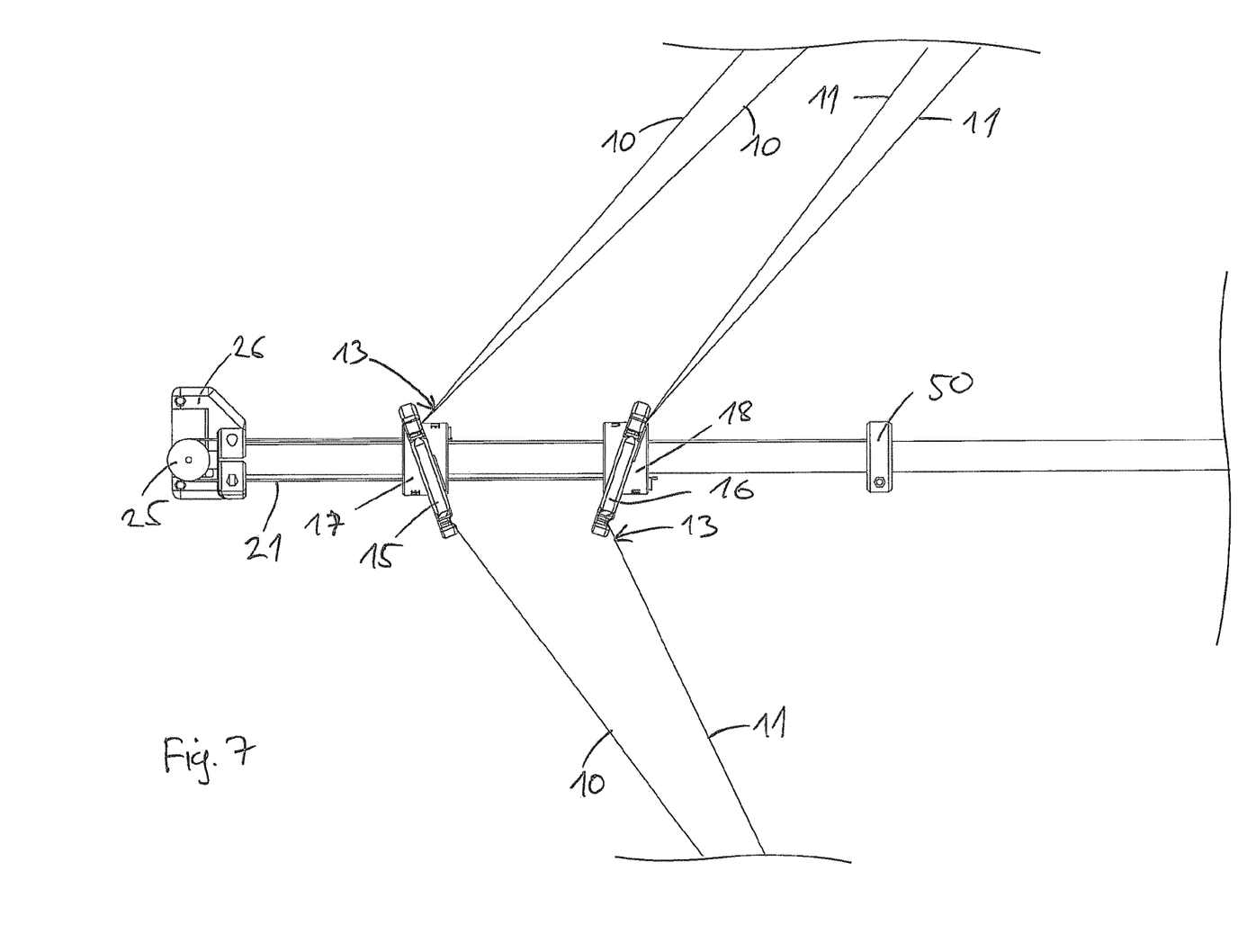
FIG. 7 is a side view the part of a pitch control system of FIG. 6.

The rotor 4 has a main rotation axis 29 (indicated in FIG. 8) being horizontal or inclined in relation to the horizontal and includes a hub 5 carrying three blades 6 being supported by blade lines 7, 8. Any suitable number of blades could be employed. Each blade 6 is attached rotatably to the hub 5 about a pitch axis 33 as seen in FIG. 5, and each blade 6 has a total blade length from the hub 5 to a tip 9 of the blade 6.

A wind turbine 1 is typically used to generate electricity by capturing the kinetic energy in the passing wind. The generator 62 extracts the energy from the rotational torque generated by the aerodynamic forces of the wind on the blades 6.

According to the present invention, a pitch angle of each blade 6 about the pitch axis of the blade is controllable by coordinated movement of a set of at least a first displaceable pitch control cable 10 and a second displaceable pitch control cable 11 acting on said blade 6. The at least first and second displaceable pitch control cable 10, 11 are pretensioned, preferably by means of cable tensioners arranged permanently or removably on the wind turbine 1. The at least first and second displaceable pitch control cable 10, 11 has the form of a thin line or tether typically made of a high strength material to keep the mass and aerodynamic drag low. In the illustrated embodiment, a first and a second displaceable pitch control cable 10, 11 are employed. Each pitch control cable 10, 11 has a blade end 12 being attached to the respective blade 6 at a longitudinal position about the half of the total blade length away from the main rotation axis and has a boom end 13 being attached to a pitch control member 14 arranged rotatably on the main boom 3 and being adapted to displace the pitch control cable 10, 11. The blade end 12 could be attached at other longitudinal positions from the main rotation axis than that shown.

Figure 3:
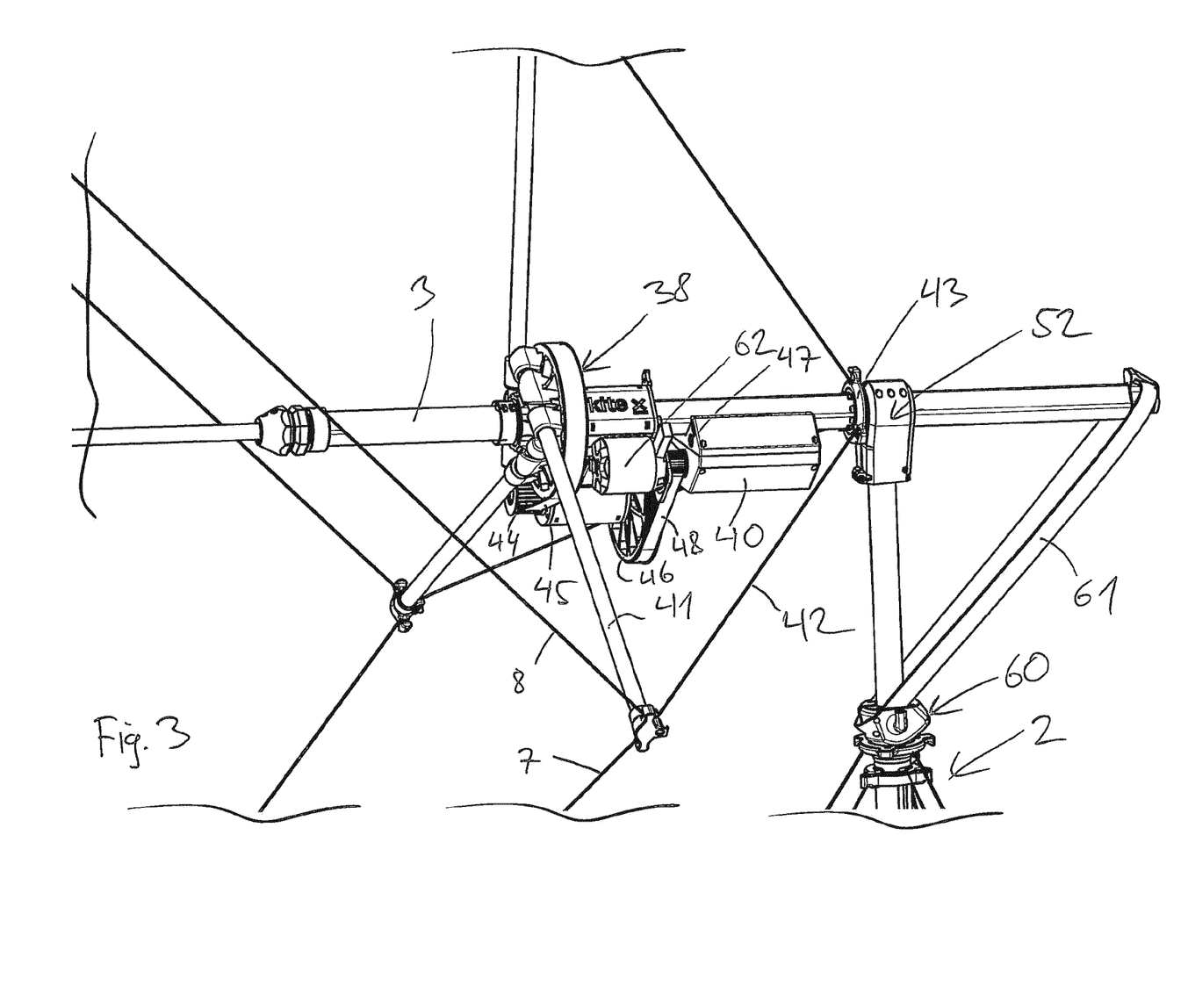
FIG. 3 illustrates a detail of the wind turbine of FIG. 2, seen on a larger scale.

As illustrated in FIGS. 6 to 9, a first and a second pitch control ring 15, 16 are arranged rotatably and in spaced relation on the main boom 3. The first pitch control ring 15 forms a common pitch control member for the first displaceable pitch control cables 10 of the respective blades 6 of the rotor 4, and the second pitch control ring 16 forms a common pitch control member for the second displaceable pitch control cables 11 of the respective blades 6 of the rotor 4. It is noted that in the illustrated embodiment, the first and a second pitch control ring 15, 16 are arranged on the main boom 3 in a downwind position in relation to the hub 5 of the rotor 4. This may be advantageous, because the first and second pitch control cables 10 may thereby provide support for the respective blades 6 on the downwind side of the hub 5, whereas the blade lines 7, 8 provide support for the respective blades 6 on the upwind side of the hub. However, the first and second pitch control ring 15, 16 may alternatively be arranged on the main boom 3 in an upwind position in relation to the hub 5 of the rotor 4. In this case, it may be considered providing the blades 6 with further blade lines supporting the blades on the downwind side. In fact, the first and second pitch control ring 15, 16 may even be arranged on a rotatable member 38 in geared connection with the generator 62 as seen in FIG. 3 and described further below. An alternative pitch control member 14 as discussed above may also be arranged on the rotatable member 38.

The rotor 4 has a main rotation axis 29 (indicated in FIG. 8) being horizontal or inclined in relation to the horizontal and includes a hub 5 carrying three blades 6 being supported by blade lines 7, 8.

The first and second pitch control rings 15, 16 are arranged displaceably on the main boom 3, and the movement of the first and second pitch control rings 15, 16 in relation to each other is coordinated for opposed sliding motion in relation to each other.

The coordinated movement of the first and second displaceable pitch control cables 10, 11 may be accomplished mechanically or electronically. However, in the embodiment illustrated, the movement of the first and second pitch control rings 15, 16 in relation to each other is coordinated for opposed sliding motion in relation to each other mechanically as described in the following.

Figure 8:
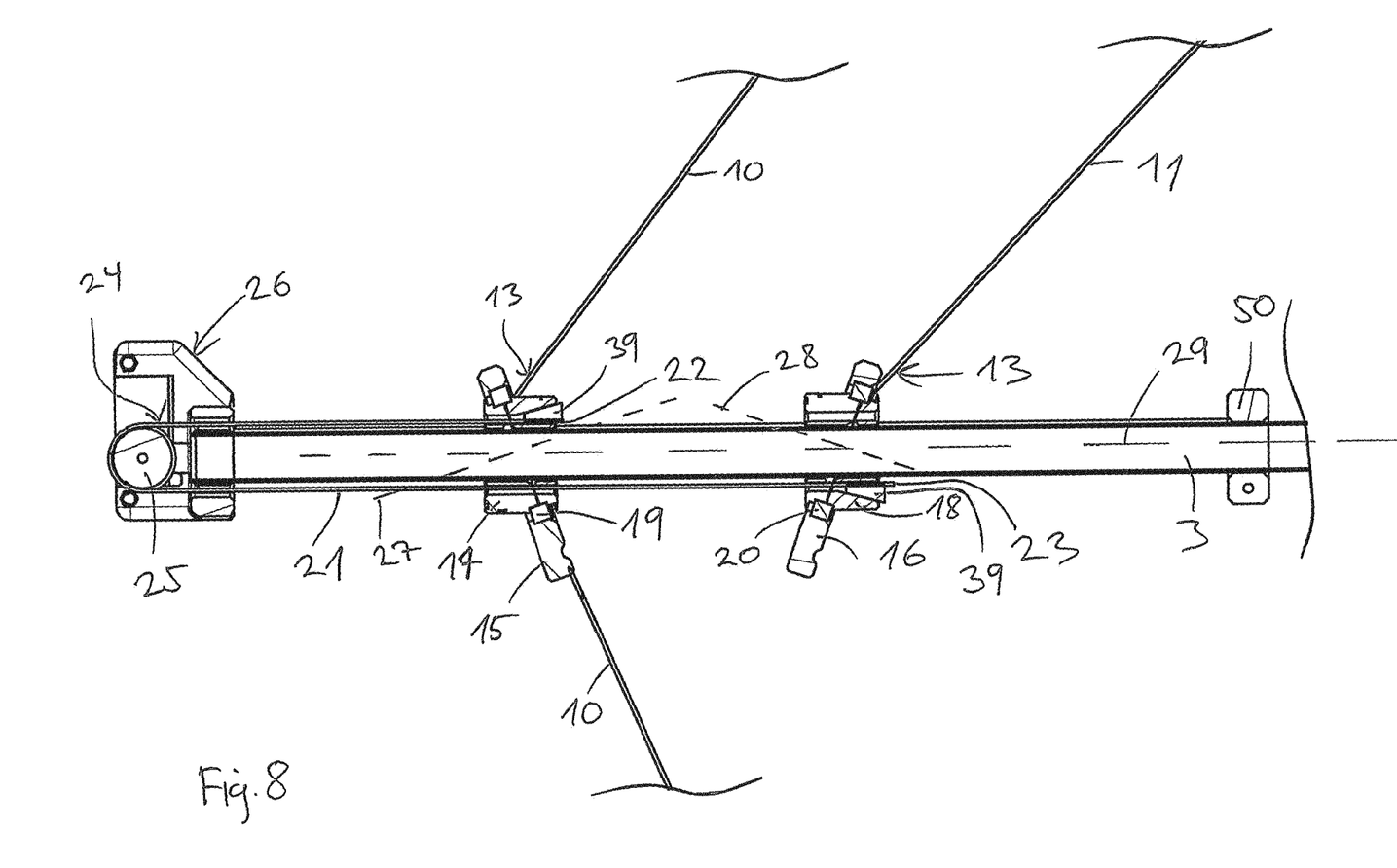
FIG. 8 is an axial section through the part of a pitch control system of FIG. 6, seen from a side.
Figure 9:
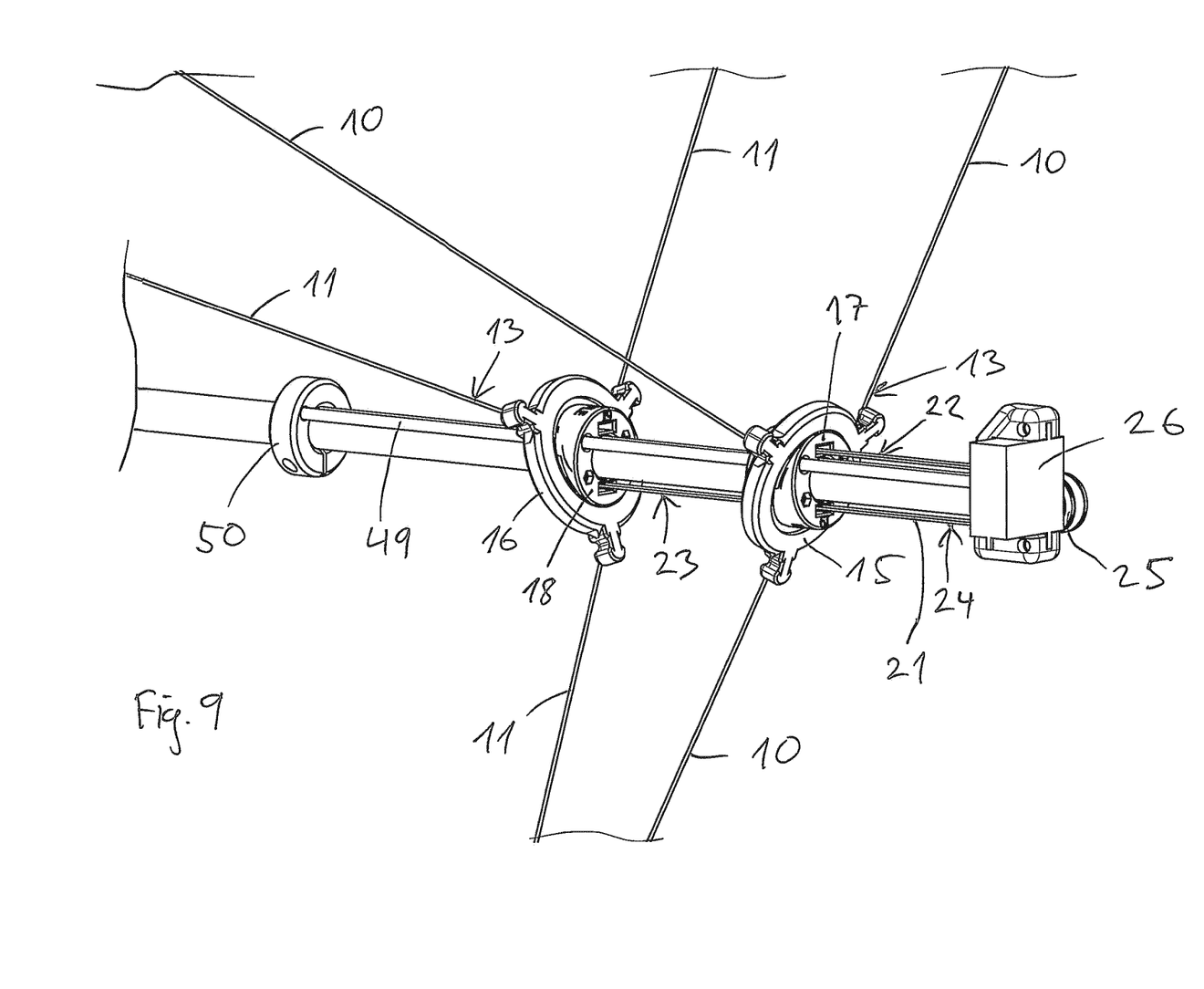
FIG. 9 is a perspective view corresponding to that of FIG. 6, but seen obliquely from an opposed side.

As illustrated in FIG. 8, first and second sliders 17, 18 carrying the first and second pitch control rings 15, 16, respectively, by means of respective first and second bearings 19, 20, are arranged displaceably along the main boom 3. The first and second bearings 19, 20 may for instance be deep groove ball bearings. A rotation locking pin 49 is arranged along the main boom 3 and fixed against rotation by means of a rotation locking pin mount 50 fixedly arranged around the main boom 3. The first and second sliders 17, 18 are provided with respective holes through which the rotation locking pin 49 extends so that the first and second sliders 17 may slide along the main boom 3, but not rotate about the mains boom 3. Of course, the first and second sliders 17 may be fixed against rotation in other ways. For instance, the main boom could have a square cross-section fitting a square hole in each first and second slider 17.

A synchronising belt 21 has a first part 22 fixed to the first slider 17 by means of a wedge 39 and a second part 23 fixed to the second slider 18 by means of a wedge 39. The synchronising belt 21 is an open belt which features a tooth profile on one side that can be used for transferring torque. The belt is typically fibre or steel reinforced. An intermediate part 24 of the synchronising belt 21 arranged between the first part 22 and the second part 23 of the belt 21 runs over a belt pulley 25 and thereby changes the direction of movement of the first part 22 of the belt 21 in relation to the second part 23 of the belt 21. The belt pulley 25 is preferably toothed and is driven by means of a common pitch servo drive 26. The common pitch servo drive 26 may communicate with a control box 40 arranged on the main boom 3 by means of cabling or wirelessly. The common pitch servo drive 26 may be able to rotate more than 360 degrees and feature an internal feedback mechanism such that its angle of rotation is known.

As illustrated in FIG. 8, the first and second pitch control rings 15, 16 have respective first and second rotation axes 27, 28 which are inclined in opposite directions in relation to the main rotation axis 29 of the rotor 4. Thereby, cyclic pitch movement as described above may be achieved. The respective first and second rotation axes 27, 28 are inclined generally in a vertical plane including a longitudinal axis of the tower, however, variations may occur.

In a not illustrated embodiment, the angle between the first rotation axis 27 and the main rotation axis 29 of the rotor 4 and the angle between the second rotation axis 28 and the main rotation axis 29 of the rotor 4, respectively, are adjustable by means of respective inclination servos or by means of a single common inclination servo.

The rotor of the wind turbine 1 is particularly structurally optimised in that the central part of the rotor 4 is extremely lightweight. This is achieved in that each blade 6 includes a spar 30 and an airfoil 31, wherein the spar 30 connects the airfoil 31 to the hub 5. In the illustrated embodiment, the spar 30 has a length of approximately half of the total blade length from the hub 5 to the tip 9 of the blade 6. The blade end 12 of each pitch control cable 10, 11 is attached to the respective blade 6 at the connection between the spar 30 and the airfoil 31. However, the blade end 12 of each pitch control cable 10, 11 may be attached to the respective blade 6 longer away from the main rotation axis 29. The spar 30 is preferably a straight, thin and elastic lightweight rod that is not provided with an aerodynamic profile like that of the airfoil 31.

As illustrated in greater detail in FIG. 5, each blade 6 is provided with a blade torsion beam 32 extending in a traverse direction of the pitch axis 33 of said blade 6. In the illustrated embodiment, the blade torsion beam 32 extends in a direction from a leading edge 34 to a trailing edge 35 of said blade 6, and more specifically approximately in a direction of a chord of said blade 6. The blade end 12 of the first displaceable pitch control cable 10 is connected at a first end 36 of the blade torsion beam 32, and the blade end 12 of the second displaceable pitch control cable 11 is connected at a second end 37 of the blade torsion beam 32.

Figure 4:
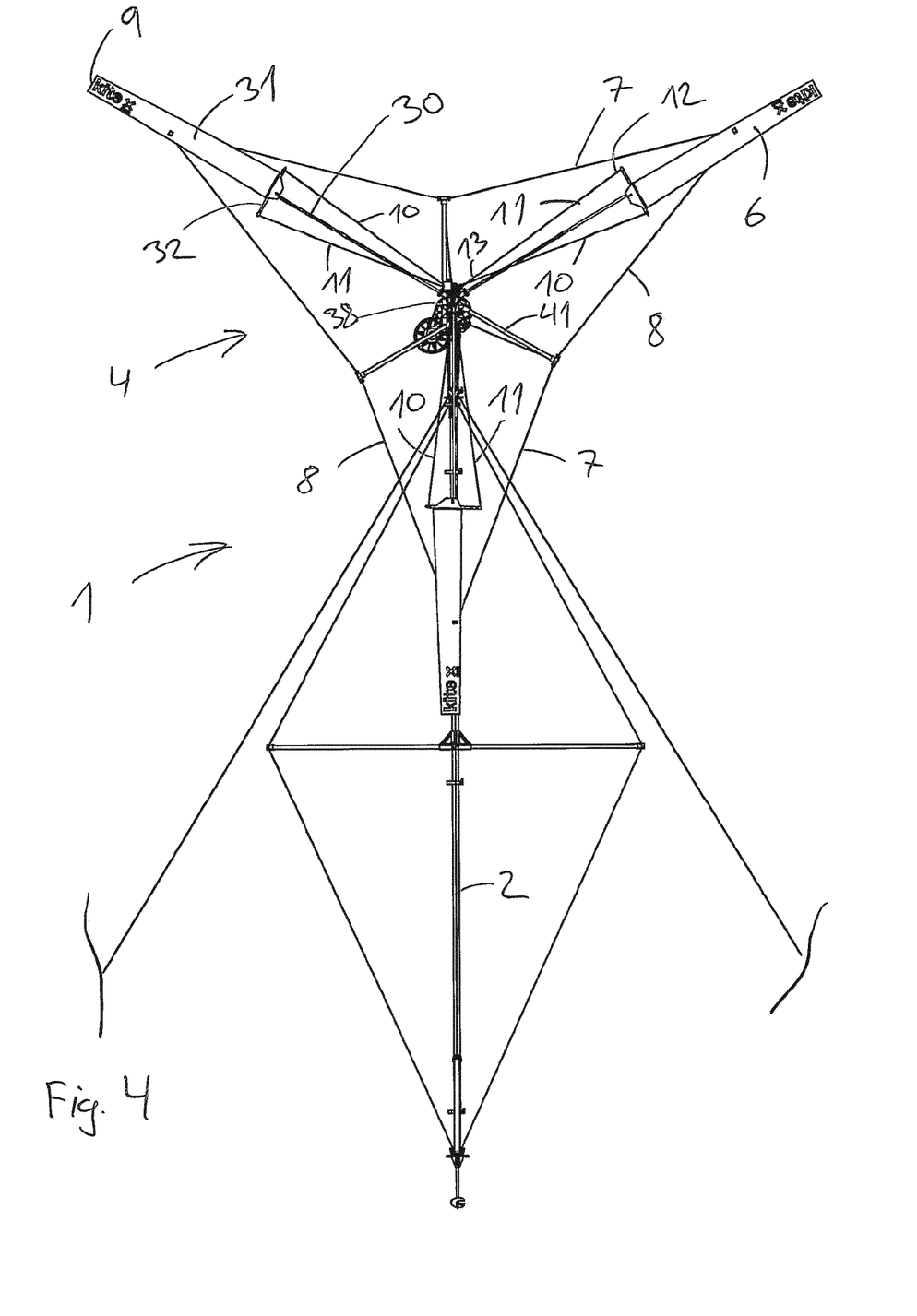
FIG. 4 is an end view of part of the wind turbine of FIG. 1, seen directly against the wind direction.

As best visible in FIG. 4, the blade lines 7, 8 are arranged to transfer a torque resulting from a load on the blades 6 of the rotor 4 to the rotatable member 38 in geared connection with the generator 62 as seen in FIG. 3. As seen, the rotatable member 38 is provided with three rods 41, each rod 41 extending from the rotatable member 38 to an angular position at the middle of the angle between two neighbouring rotor blades 6. From the free end of each rod 41, two blade lines 7, 8 extend to different neighbouring blades 6, thereby forming an obtuse angle with each other. Thereby it is ensured that the blade lines 7, 8 may effectively transfer a torque from the blades 6 to the rotatable member 38. However, whereas the connection point of each rod 41 with the corresponding blade lines 7, 8 should be placed at an angular position between two neighbouring rotor blades 6 in order to transfer a torque, is does not need to be placed at the middle of the angle between the neighbouring rotor blades 6.

Figure 2:
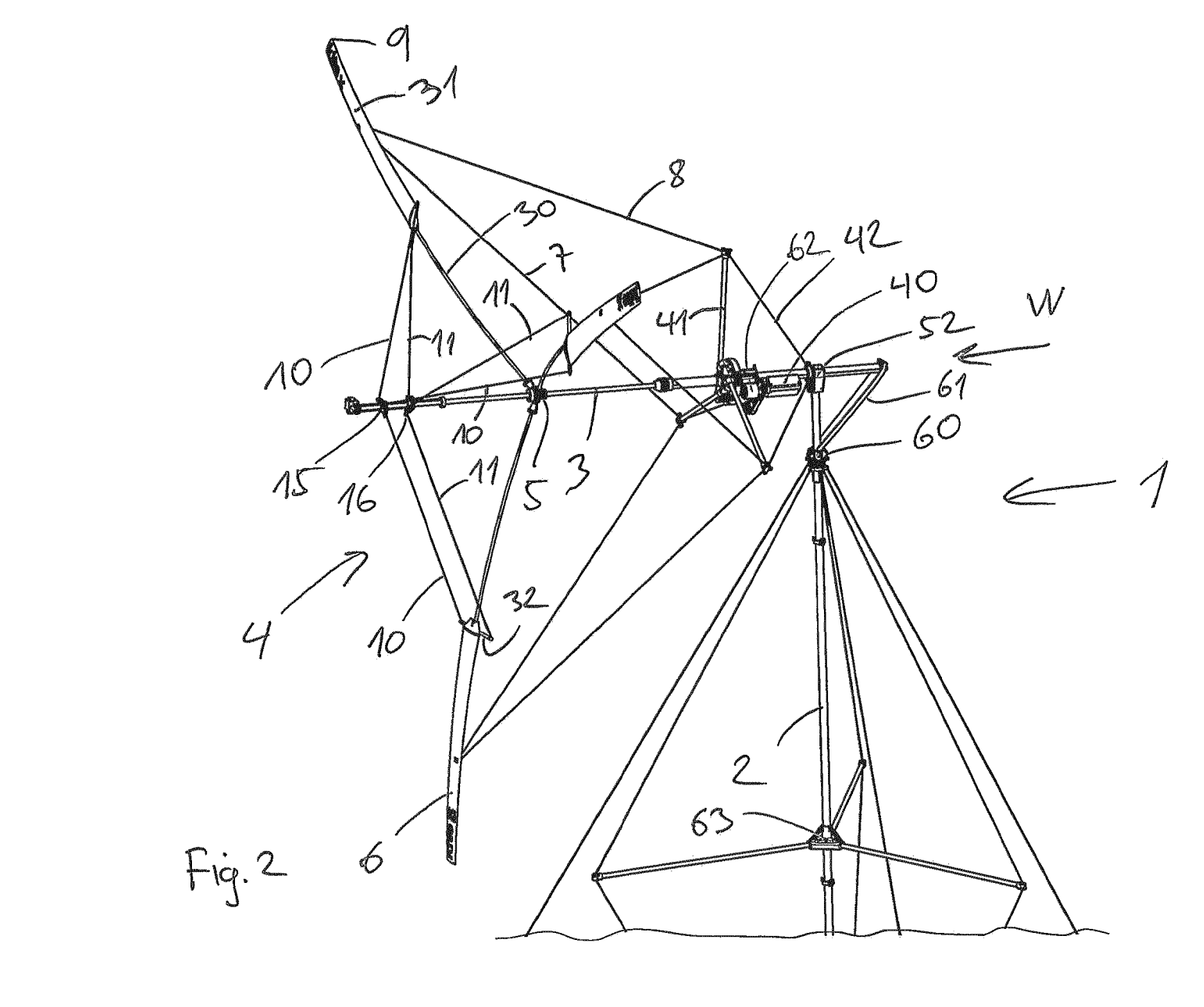
FIG. 2 is a perspective view of part of the wind turbine of FIG. 1, seen slightly obliquely against the wind direction.

As further seen in FIGS. 2 and 4, the free end of each rod 41 is connected to a rotatable ring 43 arranged on the main boom 3 by means of a supporting line 42.

The rotatable member 38 forms a relatively larger pulley driving a relatively smaller pulley 44 by means of a belt 45. The relatively smaller pulley 44 is arranged on a not visible spindle provided with a relatively larger pulley 46 at its opposed end. The latter relatively larger pulley 46 drives a relatively smaller pulley 47 arranged on the generator 62 by means of a belt 48. Thereby, a suitable gearing between the rotor 4 and the generator 62 is obtained.

The different components of the structurally optimised wind turbine 1 illustrated in the figures are as follows:

Lower Parts:

1. Tower 2: made of two or more sections 51, connected in a central tower node 63 or nodes.

2. Cross Tree 53: the cross tree node holds the tower sections together and also has three or more cross tree arms 54. These arms change the angle at which tower shroud lines 55 attach the bottom to the top. These are pretensioned and drastically increase the stiffness of the tower 2. This may be compared to the cross tree on a sailing boat.

3. Guy wire 56: The guy wires hold the tower 2 upright. There can be three or more. The guy wires also take the wind-load and these forces are held by ground anchors 57.

4. Ground Anchor 57: The ground anchor holds the guy wire 56.

5. Guy wire tension belt 58: The tension belt makes pretensioning the guy wires 56 easy, as well as allows to adjust for uneven terrain, and alignment of the tower 2 (and thus the wind turbine 1).

6. Tower foot 59: The foot takes the pretension load from the guy wires (the tower 2 is under compression), and also has a slot/hole for an electric cable (for getting power away from the wind turbine 1). It 59 also has attachment points for the shroud lines 55. As the turbine yaws (changes in wind direction means the turbine yaws/rotates) the tower foot 59 is able to rotate. A plastic interface may be used, but this could also be a bushing or a thrust-bearing in alternative/larger versions.

7. Yaw swivel ring 60: A ring with a bearing that allows the top part and tower of the wind turbine 1 to rotate. The guy wires 56 are connected to this ring 60. The guy wires are stationary/fixed to the ground.

8. Main Boom tension belt 61: Belt to tension the main boom 3 and the tower 2. This makes a strong triangle shape and holds the main boom moment to the tower 2. (Increasing stiffness)

Upper Parts:

9. Tower node 52: connects tower 2 and main boom 3 together.

10. Control box 40: Electronics; motor controller, microcomputer for control.

11. Main Gear: Takes the lower rotational speed from the blades 6 and increases it to a higher speed for the generator 62.

12. BLDC Generator 62: Permanent magnet BrushLess Direct Current generator/motor. Makes power. Converts mechanical power to electric power. Other types of generator could be used and any suitable number of generators could be used. Alternatively to the illustrated arrangement of the generator or generators, each blade could be provided with a small wind turbine including a generator.

13. Blades 6: Transfers torque through the blade lines 7, 8 to the gear. The rotor geometry is designed with a small amount of cone angle (5-10) degrees, which allows the rotor to self-align with the wind direction (yaw).

14. Blade lines 7, 8 (tethers): Transfers the torque. There are upwind lines and downwind lines to hold the rotor 4 stiff.

15. Blade Torsion Beam 32. A beam mounted roughly the middle of the blade 6 that allows the downwind (leading edge, and trailing edge) tethers, i.e. the first and second displaceable pitch control cables 10, 11 to transfer a moment to the blade 6 controlling its pitch.

Generally, all cables, lines, tethers etc. are pretensioned, preferably by means of cable tensioners arranged permanently or removably on the wind turbine 1.

In alternative embodiment the cyclic pitch action could also be made to work in a passive manner by the use of a gyro stabilizer or mechanically coupling it to the tension in the first and second displaceable pitch control cables 10, 11.

The common pitch servo drive 26 can be placed at the end of the main boom 3 as illustrated with the advantage that the pitch mechanism also has the effect of structurally enhancing the rotor 4 by providing a force to hold the blades 6 in case the lift of the blade becomes negative. It also makes it easier for the belt 21 to wrap around the end of the boom. The common pitch servo drive 26 can alternatively be placed at the opposite end of the main boom 3 with the advantage that the heavy components of the pitch mechanism can be placed close to the top of the tower 2 reducing the moment generated by the boom 3 and rotor 4 on the tower.

The term "guy wire" includes chains and linked rods, attached to support a tower similarly to guy wires.

The invention claimed is:

1. A wind turbine including a tower supporting a main boom carrying a rotor of the axial flow type and at least one generator,
    the rotor having a main rotation axis, the rotor including a hub carrying a number of blades being supported by blade lines,
    each blade being attached rotatably to the hub about a pitch axis, which is parallel to a longitudinal direction of the each blade and at an angle to the main rotation axis of the rotor, and
    each blade having a total blade length from the hub to a tip of the blade, wherein
    a pitch angle of each blade about its pitch axis is controllable by coordinated movement of a set of at least a first displaceable pitch control cable and a second displaceable pitch control cable acting on said blade, and in that each pitch control cable has a blade end being attached to the respective blade and has a boom end being attached to a pitch control member arranged rotatably on the main boom and being adapted to displace the pitch control cable.

2. A wind turbine according to claim 1, wherein at least a first and a second pitch control ring are arranged rotatably on the main boom, wherein the first pitch control ring forms a common pitch control member for the first displaceable pitch control cables of the respective blades of the rotor, and wherein the second pitch control ring forms a common pitch control member for the second displaceable pitch control cables of the respective blades of the rotor.

3. A wind turbine according to claim 2, wherein the first and second pitch control rings are arranged displaceably on the main boom, and wherein the movement of the first and second pitch control rings in relation to each other is coordinated for opposed sliding motion in relation to each other.

4. A wind turbine according to claim 3, wherein first and second sliders carrying the first and second pitch control rings, respectively, by means of respective first and second bearings, are arranged displaceably along the main boom, wherein a synchronising belt has a first part fixed to the first slider and a second part fixed to the second slider, wherein an intermediate part of the synchronising belt arranged between the first part and the second part of the belt runs over a belt pulley and thereby changes the direction of movement of the first part of the belt in relation to the second part of the belt, and wherein the belt pulley is driven by means of a common pitch servo drive.

5. A wind turbine according to claim 3, wherein the first and second pitch control rings have a respective first and second rotation axes which are included in opposite directions in relation to the main rotation axis of the rotor.

6. A wind turbine according to claim 3, wherein the first and second pitch control rings have respective first and second rotation axes, wherein an angle between the first rotation axis and the main rotation axis of the rotor and an angle between the second rotation axis and the main rotation axis of the rotor, respectively, are adjustable by means of respective inclination servos or by means of a single common inclination servo.

7. A device according to claim 3, wherein each blade includes a spar and an airfoil, wherein the spar connects the airfoil to the hub, wherein the spar has a length of at least ⅓, and preferably at least ½ of the total blade length from the hub to the tip of the blade, and wherein the blade end of each pitch control cable is attached to the respective blade at the connection between the spar and the airfoil or longer away from the main rotation axis.

8. A wind turbine according to claim 2, wherein first and second sliders carrying the first and second pitch control rings, respectively, by means of respective first and second bearings, are arranged displaceably along the main boom, wherein a synchronising belt has a first part fixed to the first slider and a second part fixed to the second slider, wherein an intermediate part of the synchronising belt arranged between the first part and the second part of the belt runs over a belt pulley and thereby changes the direction of movement of the first part of the belt in relation to the second part of the belt, and wherein the belt pulley is driven by means of a common pitch servo drive.

9. A wind turbine according to claim 8, wherein the first and second pitch control rings have a respective first and second rotation axes which are included in opposite directions in relation to the main rotation axis of the rotor.

10. A wind turbine according to claim 8, wherein the first and second pitch control rings have respective first and second rotation axes, wherein an angle between the first rotation axis and the main rotation axis of the rotor and an angle between the second rotation axis and the main rotation axis of the rotor, respectively, are adjustable by means of respective inclination servos or by means of a single common inclination servo.

11. A device according to claim 8, wherein each blade includes a spar and an airfoil, wherein the spar connects the airfoil to the hub, wherein the spar has a length of at least ⅓, and preferably at least ½ of the total blade length from the hub to the tip of the blade, and wherein the blade end of each pitch control cable is attached to the respective blade at the connection between the spar and the airfoil or longer away from the main rotation axis.

12. A wind turbine according to claim 2, wherein the first and second pitch control rings have a respective first and second rotation axes which are included in opposite directions in relation to the main rotation axis of the rotor.

13. A device according to claim 12, wherein each blade includes a spar and an airfoil, wherein the spar connects the airfoil to the hub, wherein the spar has a length of at least ⅓, and preferably at least ½ of the total blade length from the hub to the tip of the blade, and wherein the blade end of each pitch control cable is attached to the respective blade at the connection between the spar and the airfoil or longer away from the main rotation axis.

14. A wind turbine according to claim 2, wherein the first and second pitch control rings have respective first and second rotation axes, wherein an angle between the first rotation axis and the main rotation axis of the rotor and an angle between the second rotation axis and the main rotation axis of the rotor, respectively, are adjustable by means of respective inclination servos or by means of a single common inclination servo.

15. A device according to claim 14, wherein each blade includes a spar and an airfoil, wherein the spar connects the airfoil to the hub, wherein the spar has a length of at least ⅓, and preferably at least ½ of the total blade length from the hub to the tip of the blade, and wherein the blade end of each pitch control cable is attached to the respective blade at the connection between the spar and the airfoil or longer away from the main rotation axis.

16. A device according to claim 2, wherein the blade lines are arranged to transfer a torque resulting from a load on the blades of the rotor to a rotatable member in geared connection with the generator.

17. A device according to claim 2, wherein each blade includes a spar and an airfoil, wherein the spar connects the airfoil to the hub, wherein the spar has a length of at least ⅓, and preferably at least ½ of the total blade length from the hub to the tip of the blade, and wherein the blade end of each pitch control cable is attached to the respective blade at the connection between the spar and the airfoil or longer away from the main rotation axis.

18. A device according to claim 2, wherein each blade is provided with a blade torsion beam extending in a traverse direction of the pitch axis of said blade, preferably in a direction from a leading edge to a trailing edge of said blade, and more preferred in a general direction of a chord of said blade, wherein the blade end of the first displaceable pitch control cable is connected to a first end of the blade torsion beam, and wherein the blade end of the second displaceable pitch control cable is connected at a second end of the blade torsion beam.

19. A device according to claim 1, wherein each blade includes a spar and an airfoil, wherein the spar connects the airfoil to the hub, wherein the spar has a length of at least ⅓, and preferably at least ½ of the total blade length from the hub to the tip of the blade, and wherein the blade end of each pitch control cable is attached to the respective blade at the connection between the spar and the airfoil or longer away from the main rotation axis.

20. A device according to claim 1, wherein each blade is provided with a blade torsion beam extending in a traverse direction of the pitch axis of said blade, preferably in a direction from a leading edge to a trailing edge of said blade, and more preferred in a general direction of a chord of said blade, wherein the blade end of the first displaceable pitch control cable is connected to a first end of the blade torsion beam, and wherein the blade end of the second displaceable pitch control cable is connected at a second end of the blade torsion beam.

* * * * *